United States Patent [19]

Rider et al.

[11] Patent Number: 4,483,149
[45] Date of Patent: Nov. 20, 1984

[54] DIFFUSER CASE FOR A GAS TURBINE ENGINE

[75] Inventors: Gerald R. Rider, Glastonbury; Willard J. Seibert, Manchester, both of Conn.

[73] Assignee: United Technologies Corporation, Hartford, Conn.

[21] Appl. No.: 380,460

[22] Filed: May 20, 1982

[51] Int. Cl.³ .............................................. F02C 7/00
[52] U.S. Cl. ..................................... 60/751; 60/39.31
[58] Field of Search ................ 60/39.31, 39.32, 39.36, 60/39.37, 749, 751, 236; 415/207

[56] References Cited

U.S. PATENT DOCUMENTS 3,372,542  3/1968  Sevetz ................................... 60/751

Primary Examiner—Louis J. Casaregola
Assistant Examiner—Timothy S. Thorpe
Attorney, Agent, or Firm—Norman Friedland

[57] ABSTRACT

The strut supporting the diffuser to the engine outer case wall which also supports the shaft bearing of a turbine engine is conically shaped having its base located downstream with respect to the flow of the engine working medium and is judiciously angled so that the line of action for the bearing load is aligned to coincide with this angle, pass through the strut and intersect the centerline of the engine and the midpoint of the bearing. This enhances the stiffness of the support, reducing the weight necessary to support the same load. The diffuser case and support from the diffuser to the bearing is offset from the strut to minimize direct radial thermal incompatibility and the diffuser is spaced from the outer engine case wall reducing thermal stresses.

3 Claims, 2 Drawing Figures

F=Force
A=Axial
r=Radial
R=Resultant

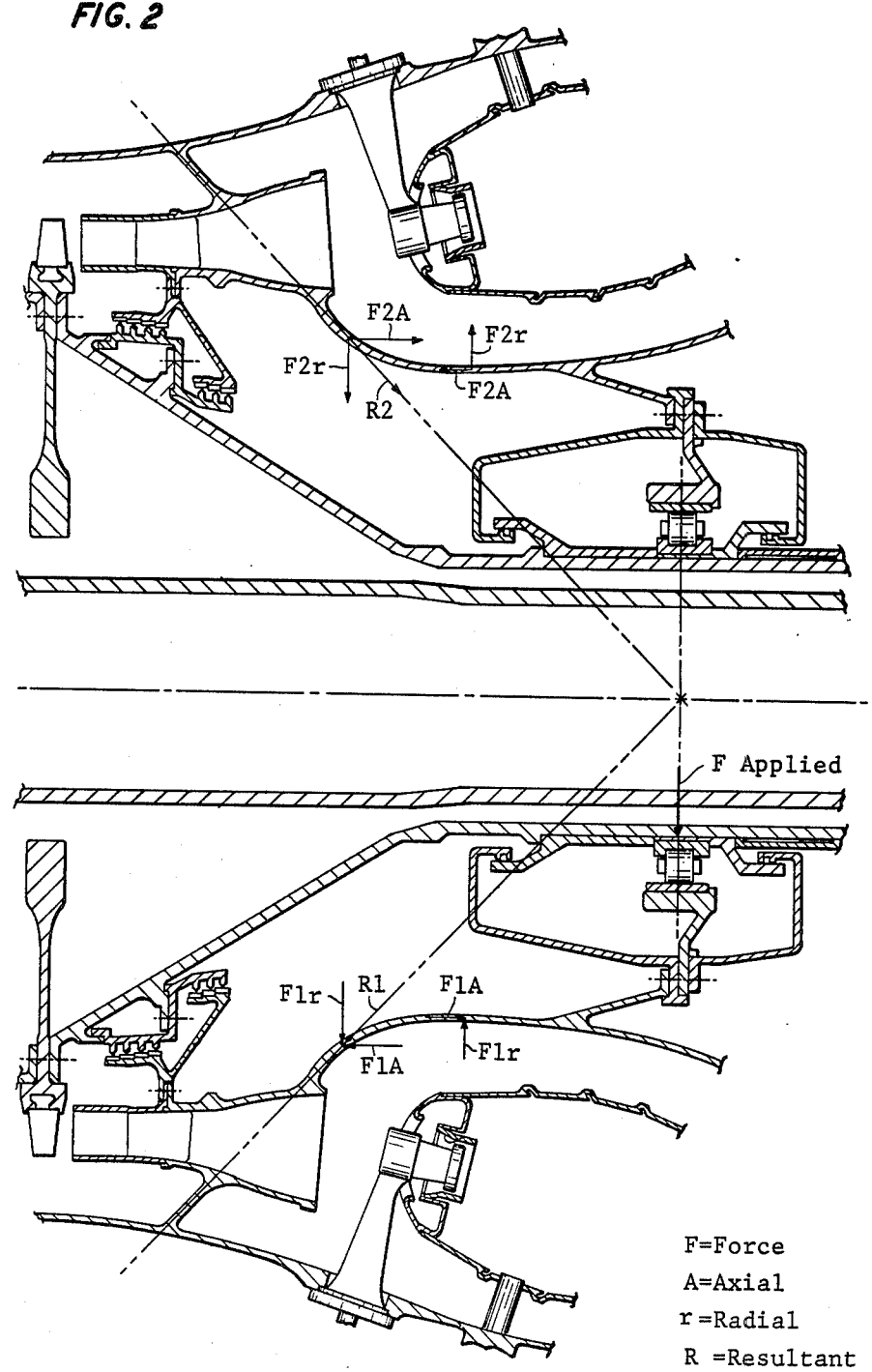

DIFFUSER CASE FOR A GAS TURBINE ENGINE

DESCRIPTION

1. Technical Field

This invention relates to gas turbine engines and particularly to the diffuser structure, shaft bearing and the support thereof.

2. Background Art

As is well known, the diffuser is housed in and supported by the engine case wall and is disposed in proximity to the compressor for working the compressor discharge air by removing the swirl component and converting the dynamic pressure to a static pressure prior to being admitted into the burner. Typically, in heretofore designs, the diffuser is located in the highly concentrated load support structure and/or fixed in proximity to the outer case wall of the engine. In certain designs, the diffuser shell is contiguous with the outer case subjecting the outer case wall and gas path and diffuser structures to high temperture differential. Obviously, such a construction not only imposes a high weight factor but also is subjected to high thermal stresses.

We have found that we can minimize the high thermal stresses and greatly reduce the weight by judiciously selecting the cone angle of the outer shell attaching the diffuser to the engine case wall hereinafter referred to as frustoconical shell. The frustoconical shell serves to transmit the load from the engine shaft bearing to the outer case wall and this invention comtemplates supporting the diffuser assembly away from the outer case. According to this invention, the frustoconical shell is shaped in a frusto-conical member and is oriented such that the line of action for the load of the bearing supported by the engine case wall passes through it and intersects the centerline of the engine and the midpoint of that bearing. This yields maximum bearing support stiffness by eliminating the bending flexibility through the frustoconical shell and across the gas path (diffuser). The inner shell supporting the bearing to the diffuser is hereinafter referred to as the support member. This support member is offset from the frustoconical shell relative to the gas path (diffuser) by offsetting the gas path support shells to maximize thermal flexibility and hence eliminating a direct radial thermal incompatibility. The diffuser and gas path structure is supported to, but spaced from, the outer case wall as viewed in a single transverse plane, for reducing thermal stress.

DISCLOSURE OF INVENTION

An object of this invention is to provide for a gas turbine engine an improved diffuser and bearing support construction that is characterized by being lighter in weight than heretofore designs and reduces thermal stresses. A feature of this invention is to provide a frusto-conically shaped shell extending from the outer engine case to support the diffuser and engine shaft bearing and being oriented such that the line of action of the bearing passes through the frustoconical shell from the top to base and intersects the engine's centerline and the midpoint of the bearing, so as to provide stiffness to the support structure. Another feature of the invention is to offset the diffuser shells (frustoconical and support member) relative to the gas path and provide a single plane attachment for supporting the diffuser away from the outer case wall to minimize thermal incapacity so as to enhance thermal flexibility and reduce thermal stresses.

Other features and advantages will be apparent from the specification and claims and from the accompanying drawing which illustrate an embodiment of the invention.

BRIEF DESCRIPTION OF THE DRAWING

FIG. 2 is a view showing the free body diagram when a radial force is applied to the radial bearing of FIG. 1.

BEST MODE FOR CARRYING OUT THE INVENTION

Figure 1:
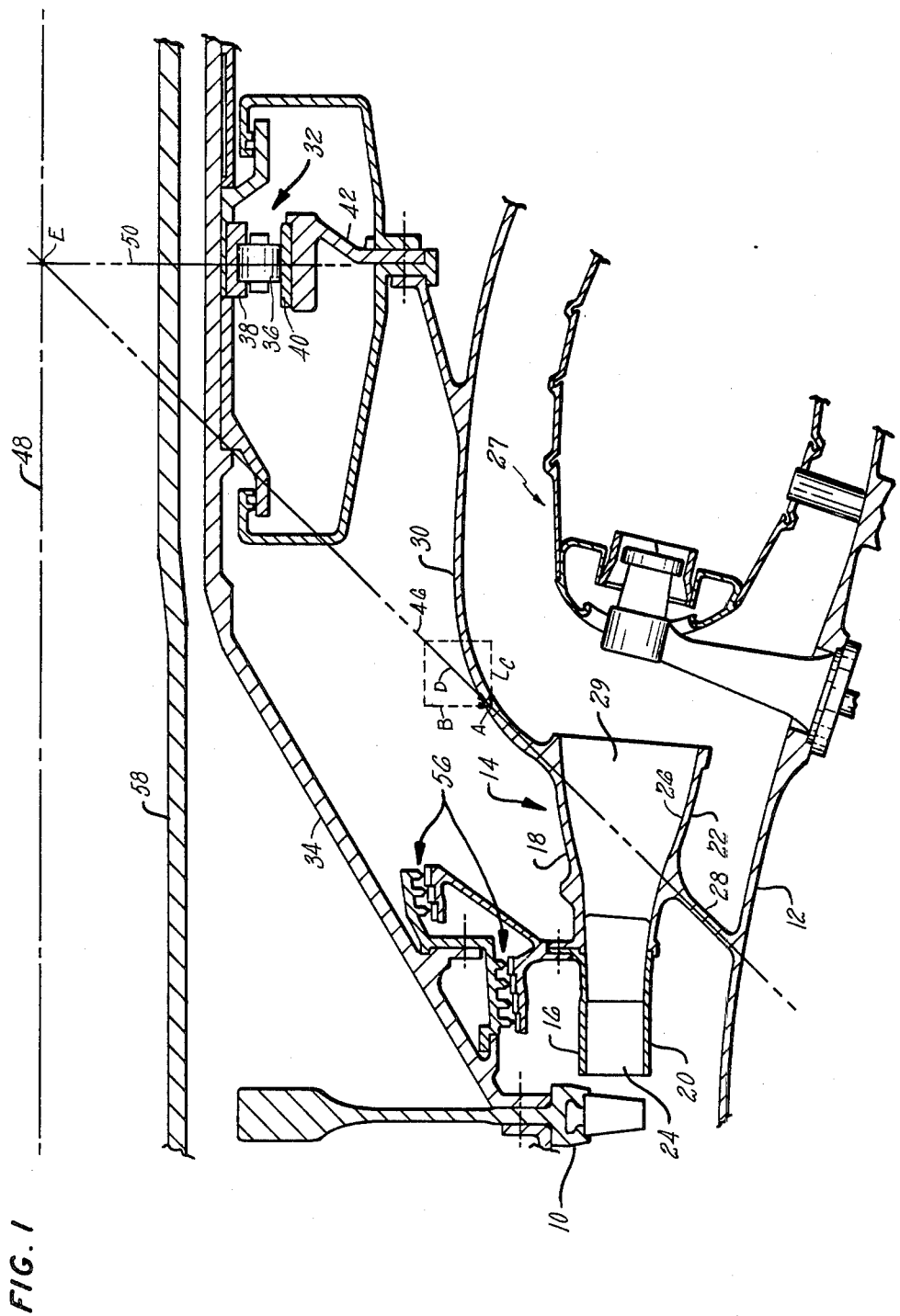
FIG. 1 is a partial view in schematic and section illustrating the invention in a gas turbine engine.

As was alluded to in the above, because of the high loads and the thermal stresses attendant the diffuser structure and bearing support, the hardware in heretofore designs, by necessity, was "beefed up" to accommodate the same. For example, the temperature differential in a radial direction from the air discharging from the compressor 10 to the outer engine case wall 12 would typically be over 500° F. This, coupled with the large bearing loads to which this mechanism is subjected, makes apparent the stress problem attendant this area. For more details of a typical construction reference should be made to the JT9D engine manufactured by Pratt and Whitney Aircraft division of United Technologies Corporation, the assignee of this patent application.

The gas path and prediffuser structure 14 comprises the inner annular wall 16 and its complimentary aligned inner annular wall 18 and the outer annular wall 20 and its complimentary aligned outer annular wall 22 which serve to accept the compressor air to eliminate the swirl component and work the air to diffuse it so that the dynamic head is converted to a static head. Hence at the inlet of the diffuser and gas path structure 14, namely where the inner and outer walls are parallel, a plurality of guide vanes 24 serve to straighten the air. Where the inner and outer walls diverge radially to form the diffuser section 26, the pressure of the air is converted. This leads the air to the dump diffuser just ahead of the annular burner 27 where it is further worked just prior to being admitted into the combustor. A plurality of diffuser struts 29 are circumferentially spaced about the diffuser to support the inner annular member to the outer annular member.

According to the invention the diffuser and gas path structure 14 is supported by the frusto-conical shell 28 radially inward from the outer engine case wall 12. The support member 30 extends radially and axially from the inner annualar wall 18 to connect to the bearing mechanism generally indicated by reference numeral 32. As can be seen from FIG. 1 the shell 28 at its plane of attachment to the outer annular aligned member 22 is offset axially relative to the plane of attachment of support member 30 to the inner annular aligned member 18. This serves to maximize thermal flexibility and eliminate a direct thermal incompatibility.

The bearing mechanism is shown schematically for the sake of convenience and simplicity but suffice it to say that the load transmitted therethrough is taken through the outer diffuser case 12, the frusto-conical support member 28, the diffuser 14, the support member 30 and the mechanism connecting the bearing. From the sole Figure it can be seen that the engine shaft 34 is the high pressure spool of the twin spool engine. As is typical in this type of engine the high pressure spool comprises the high pressure turbines (not shown) connected to one end and the high pressure compressor (only compressor 10 being illustrated) connected to the other end of shaft 34. Shaft 34 is concentrically mounted with respect to the low pressure spool which comprises shaft 58, the low pressure turbine (not shown) and low pressure compressor (not shown).

Obviously the roller bearings 36 sandwiched between the inner race 38 and outer race 40 with other bearings not shown serve to rotatably support shaft 34. It is apparent from the foregoing that the load imparted to the bearing mechanism 32 is transmitted to the outer engine case wall 12 via the inner race 38, roller bearings 36 (one being shown), platen support 42, support member 30, inner annular member 18, struts 29, outer annular member 22, and the frusto-conical shell 28. The frusto-conical shell 28 is designed so that the cone portion is such that the base portion at the point of contact to the outer case wall 12 extending throughout its length lies in coincidence with the dash line 46 which intersects the engine centerline 48 at the midpoint of bearing 36 represented by the dash line 50. This would be the full cone if it were extended. It will also be noted that dash line 46 represents the resultant of the bearing load as summed at point A. Thus, by resolving the component forces represented by force vectors B and C at point A, the resultant D coincides with the line of action 46. Or stated another way the line of action 46 for the bearing load passes through the frusto-conical shell 28 and intersects at the engine centerline 48 at the midpoint E of the bearing 36.

It is also apparent that the path for the compressed air which is generally in the temperature range of approximately 1000° F. is restricted to pass through the gas path and diffuser structure 14. The surrounding cavity is dammed by the labyrinth seal generally illustrated by reference numeral 56 and the frustoconical shell 28. By spacing the gas path structure and diffuser 14 radially inwardly away from the outer engine case wall 12 which is in the temperature range of approximately 500°, the gas path and diffuser structure 14 is effectively remote from any hardpoint and/or cold spot occasioned if it were attached to the outer case wall and thus further reducing the thermal stresses.

Looking at a free body diagram as exemplified by FIG. 2, applying a load in the radial direction (F applied) to the bearing will result in the sum of the forces and moments equalling zero, and the resulting load if its line of action is extended will pass through the engine's centerline where the midpoint of the bearing intersects.

It should be understood that the invention is not limited to the particular embodiments shown and described herein, but that various changes and modifications may be made without departing from the spirit and scope of this novel concept as defined by the following claims.

We claim:

1. For a gas turbine engine having an outer engine case, a shaft in said case rotatable about the engine's centerline, a roller bearing surrounding and supporting said shaft, a compressor and an annular diffuser for accepting the air discharging from said compressor, means for supporting said bearing and said annular diffuser including a frusto-conical shell member having its base end attached to said engine case and the reduced diameter end attached to said annular diffuser for spacing said annular diffuser radially inwardly away from said engine case, a shell-like member extending from a more radially inward portion of said annular diffuser and extending radially and axially from said frusto-conical shell to form a support for said bearing, the cone angle of said frusto-conical shell being selected so that a line in coincidence with and extending from the side forming said cone angle intersects said engine's centerline at the midpoint of said bearing whereby the cone angle of the frusto-conical shell maximizes stiffness of said bearing support means.

2. For a gas turbine engine as in claim 1 wherein said compressor is attached to said shaft.

3. For a gas turbine engine as in claim 2 wherein a portion of said shell-like member adjacent said annular diffuser also aligns with said line.

* * * * *